United States Patent [19]

Reuter et al.

[11] Patent Number: 4,893,665
[45] Date of Patent: * Jan. 16, 1990

[54] CABLES FOR REINFORCING DEFORMABLE ARTICLES AND ARTICLES REINFORCED BY SAID CABLES

[75] Inventors: René F. Reuter, Bürden; Thomas N. H. Welter, Keispelt, both of Luxembourg

[73] Assignee: The Goodyear Tire & Rubber Company, Akron, Ohio

[*] Notice: The portion of the term of this patent subsequent to May 23, 2006 has been disclaimed.

[21] Appl. No.: 156,621

[22] Filed: Feb. 17, 1988

[51] Int. Cl.[4] .......................... D02G 3/48; B60C 9/18
[52] U.S. Cl. ..................................... 152/451; 57/902; 152/527; 152/556
[58] Field of Search ............... 152/451, 526, 527, 548, 152/560; 57/210, 237, 902, 212, 211, 238; 428/295, 375, 377, 395

[56] References Cited

U.S. PATENT DOCUMENTS

| 1,759,410 | 5/1930 | Marston | 57/222 |
| 2,424,743 | 7/1947 | Davis | 428/293 |
| 2,792,868 | 5/1957 | Benson | 152/153 |
| 3,032,963 | 5/1962 | Fenner | 57/223 |
| 3,075,344 | 1/1963 | Fenner et al. | 57/216 |
| 3,429,354 | 2/1969 | Brooks | 57/210 |
| 3,486,546 | 12/1969 | Sidles et al. | 152/552 |
| 3,686,855 | 8/1972 | Falcy et al. | 57/220 |
| 3,831,369 | 8/1974 | Northup et al. | 57/210 |
| 3,834,149 | 9/1974 | Nisbet | 57/213 |
| 3,977,172 | 8/1976 | Kerawala et al. | 57/237 |
| 3,977,174 | 8/1976 | Boileau | 57/212 |
| 4,018,042 | 4/1977 | Maag et al. | 57/210 |
| 4,074,512 | 2/1978 | Matt | 57/210 |
| 4,155,394 | 5/1979 | Shepherd et al. | 152/527 |
| 4,159,618 | 7/1979 | Sokaris | 57/251 |
| 4,240,486 | 12/1980 | Schmit et al. | 152/152 |
| 4,272,950 | 6/1981 | Bompard | 57/232 |
| 4,299,884 | 11/1981 | Payen | 57/210 |
| 4,328,324 | 5/1982 | Kock et al. | 525/423 |
| 4,333,507 | 6/1982 | Schmit et al. | 152/527 |
| 4,343,343 | 8/1982 | Reuter | 152/556 |
| 4,470,251 | 9/1984 | Bettcher | 57/902 |
| 4,499,716 | 2/1985 | Antal et al. | 57/234 |
| 4,528,223 | 7/1985 | Kumazawa et al. | 428/36 |
| 4,530,206 | 7/1985 | Benichou et al. | 57/250 |
| 4,563,869 | 1/1986 | Stanton | 57/211 |
| 4,651,514 | 3/1987 | Collett | 57/902 X |
| 4,720,943 | 1/1988 | Arrant | 57/210 |

FOREIGN PATENT DOCUMENTS

| 0034378 | 8/1981 | European Pat. Off. . |
| 1116521 | 5/1956 | France . |
| 1413465 | 8/1965 | France . |
| 1601293 | 8/1970 | France . |
| 783157 | 9/1966 | Italy . |
| 59-38103 | 3/1984 | Japan . |
| 843274 | 5/1984 | South Africa . |
| 811501 | 4/1959 | United Kingdom . |
| 938883 | 10/1963 | United Kingdom . |
| 974776 | 11/1964 | United Kingdom . |
| 987401 | 3/1965 | United Kingdom . |
| 1014782 | 12/1965 | United Kingdom . |
| 1043314 | 9/1966 | United Kingdom . |
| 1118751 | 7/1968 | United Kingdom . |

OTHER PUBLICATIONS

Research Disclosures-Product Licensing Index, Apr. 1972, pp. 34–35, Disclosure No. 9610, "P-Monofil for Tire Reinforcement".
Research Disclosure, Dec. 1975, pp. 41–42, Disclosure No. 14057, "Hybrid Cords".

Primary Examiner—Raymond Hoch
Attorney, Agent, or Firm—L. R. Drayer

[57] ABSTRACT

A reinforcing cable (40) comprises at least two yarns (41,42,43) each of which consists only of aramid filaments, and a single core yarn (44) which consists only of filaments selected from the group consisting of polyamides having a structure which is at least partially oriented and polyesters having a structure which is at least partially oriented. The aramid yarns (41,42,43) are adjacent to one another and twisted about the core yarn (44) to manufacture a cable (40), but the aramid yarns are not twisted about one another. Articles of manufacture, such as tires, which contain the new cables are also disclosed.

5 Claims, 4 Drawing Sheets

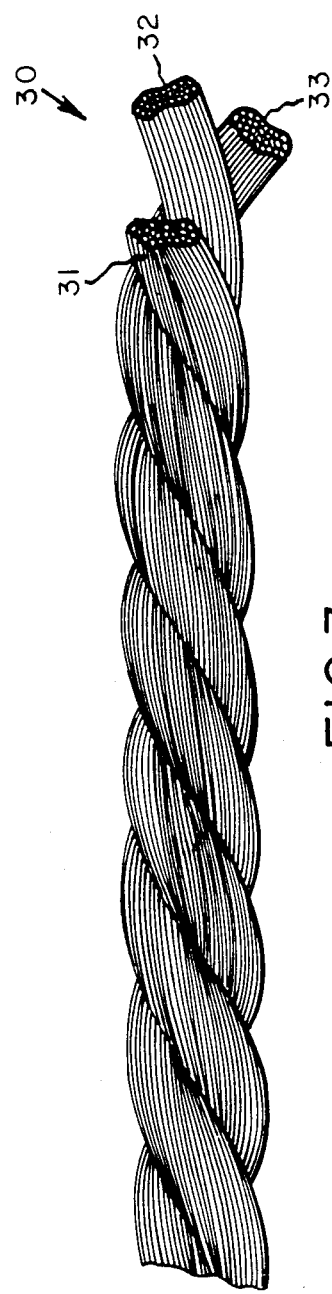
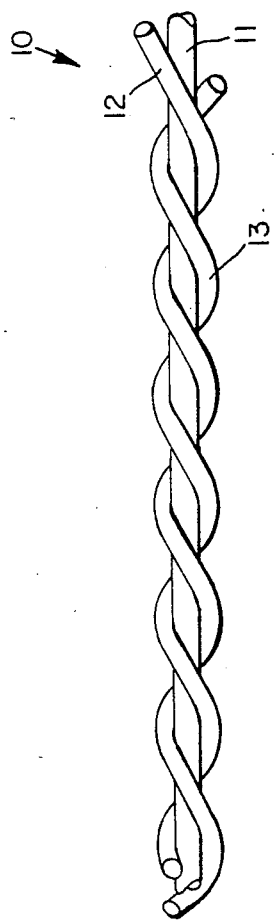
FIG.3 PRIOR ART
FIG.1 PRIOR ART

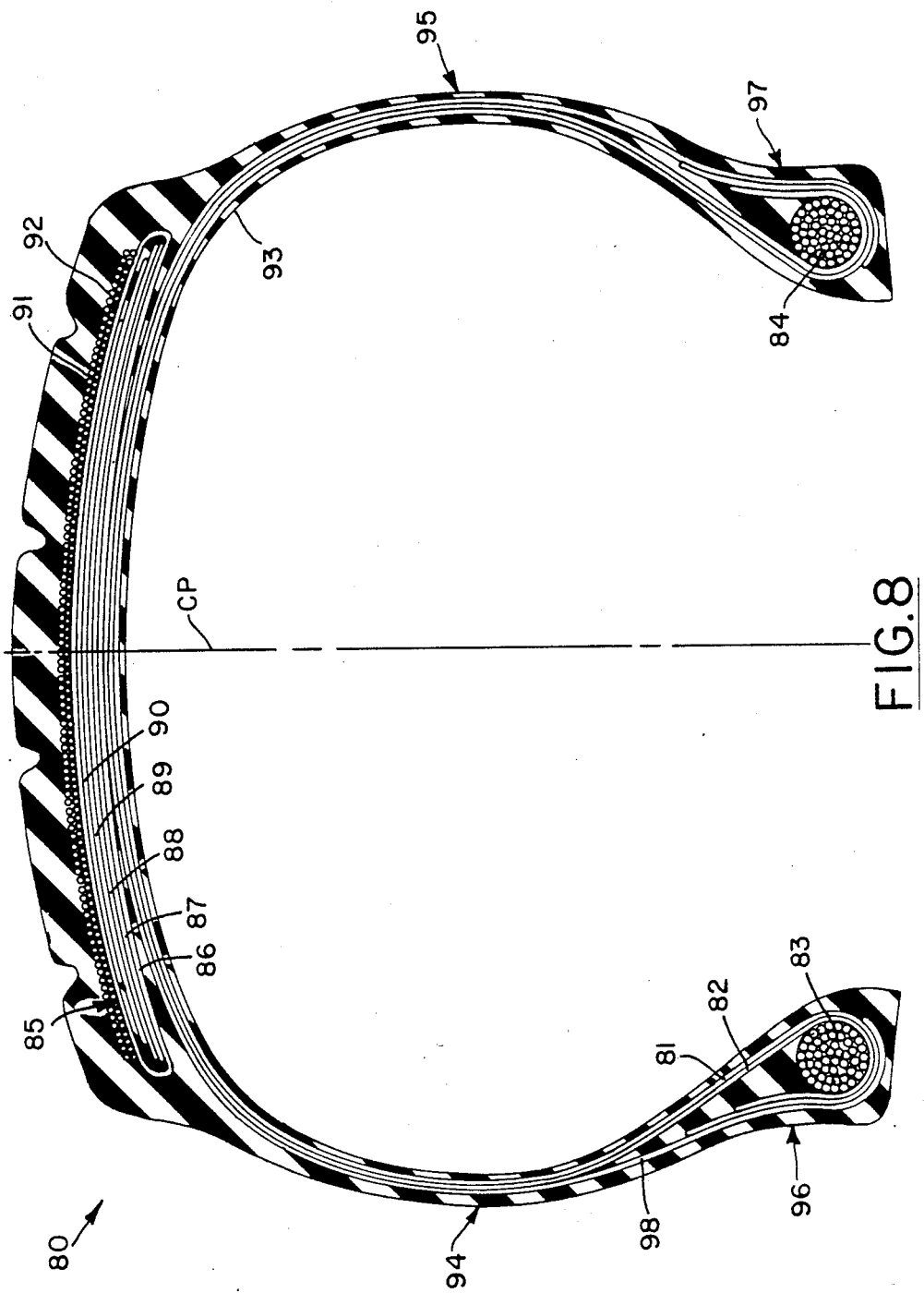

CABLES FOR REINFORCING DEFORMABLE ARTICLES AND ARTICLES REINFORCED BY SAID CABLES

The present invention relates to a cable which is useful for reinforcing a deformable article, and to articles, such as pneumatic tires, reinforced by said cables.

When an article reinforced by cables embedded in an elastomeric material, such as a tire, is subjected to rapid cycles of stresses which cause deformations of the article it is desirable that the reinforcing cables have the capacity to minimize the long term effects of the deformations upon the article. It is recognized that the properties required of a cable are dependent upon the degree of deformation to which the article will be subjected in its working environment. For example, a pneumatic tire that is mounted upon a passenger car may occasionally be subjected to large deformations, but a tire mounted upon a jet aircraft, especially a radial ply tire, is very frequently subjected to large deformations. A cable according to the present invention has utility for reinforcing the carcass ply structure and/or the belt ply structure of a tire that in use will be frequently subjected to rapid cycles of significant deformations while supporting a significant load. One example of another type of articles that may advantageously employ the new cables are airsprings.

There is provided in accordance with one aspect of the invention a cable comprising at least two yarns, each of which consists only of aramid filaments, and a single core yarn which consists only of filaments selected from the group consisting of polyamides having a structure which is at least partially oriented and polyesters having a structure which is at least partially oriented. The aramid yarns are adjacent to one another and twisted about the core yarn to manufacture a cable, but the aramid yarns are not twisted about one another.

There is provided in accordance with another aspect of the invention an article of manufacture comprising an elastomeric substance having a plurality of side-by-side cables embedded therein. Each said cable comprises at least two yarns each of which consists of only aramid filaments, and a single core yarn which consists of at least one filament selected from the group consisting of polyamides having a structure which is at least partially oriented and polyesters having a structure which is at least partially oriented, said aramid yarns being adjacent to one another and twisted about said core yarn but not about one another.

There is provided in accordance with yet another aspect of the invention a pneumatic tire having at least one belt ply comprising a plurality of side-by-side cables, each said cable comprising at least two yarns each of which consists only of aramid filaments, and a single core yarn which consists of at least one filament selected from the group consisting of polyamides having a structure which is at least partially oriented and polyesters having a structure which is at least partially oriented, said aramid yarns being adjacent to one another and twisted about said core yarn but not about one another.

There is provided in accordance with yet another aspect of the invention a pneumatic tire having at least one carcass ply comprising a plurality of side-by-side cables, each said cable comprising at least two yarns each of which consists of only aramid filaments, and a single core yarn which consists of at least one filament selected from the group consisting of polyamides having a structure which is at least partially oriented and polyesters having a structure which is at least partially oriented, said aramid yarns being adjacent to one another and twisted about said core yarn but not about one another.

There is provided in accordance with yet another aspect of the invention a pneumatic tire having at least one carcass ply and at least one belt ply, said carcass ply and belt ply each comprising a plurality of side-by-side cables, each said cable comprising at least two yarns each of which consists of only aramid filaments, and a single core yarn which consists of at least one filament selected from the group consisting of polyamides having a structure which is at least partially oriented and polyesters having a structure which is at least partially oriented, said aramid yarns being adjacent to one another and twisted about said core yarn but not about one another.

The present invention may best be understood by the following detailed description, taken in accordance with the accompanying drawings in which:

FIGS. 1–3 are enlarged views of prior art cables;

FIG. 8 is a cross-sectional view of a tire taken in a plane that contains the axis of rotation of the tire.

Figure 7:
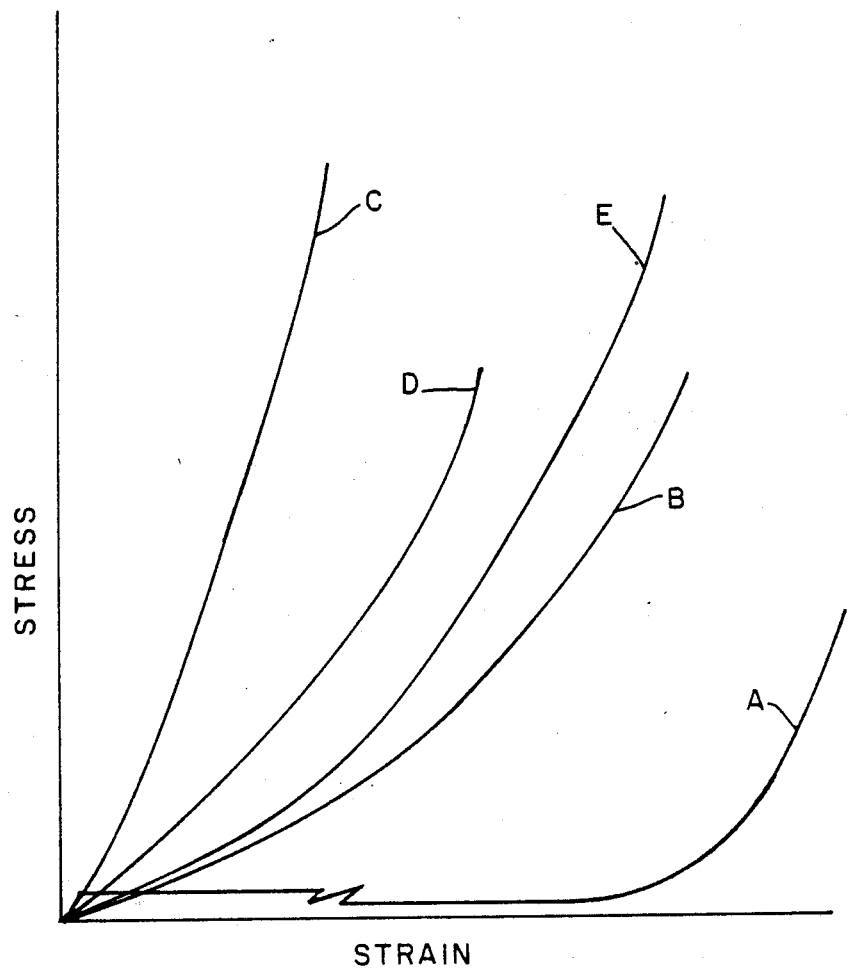
FIG. 7 is a graphic representation of stress-strain curves of the cables discussed herein.

Referring first to FIG. 1 there is shown an example of prior art cable 10 of the type taught in U.S. Pat. No. 4,343,343. This cable 10 comprises a core 11 around which is spirally or helically wrapped one or more "high tenacity" substantially inextensible yarns 12,13. One example of a "high tenacity" yarn given in U.S. Pat. No. 4,343,343 is aramid. The core 11 of this prior art cable may comprise unoriented polymeric filaments such as polyamides and polyesters which can be elongated beyond their modulus of elasticity by a relatively low stress. The resultant cable 10 exhibits stress-strain behavior of the type indicated by curve A in FIG. 7. A cable having properties of this sort has utility in the manufacture of collapsible/foldable spare tires, but because the area under curve A (which indicates the energy dissipated by the cable) is quite small this type of cable is not capable of dissipating energy at the levels necessary in tires used in some high load and high deflection applications.

Figure 2:
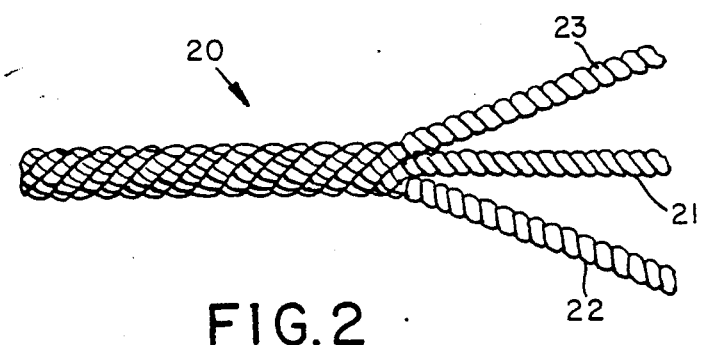

Referring next to FIG. 2 there is shown an example of a prior art cable 20 of the type taught in U.S. Pat. No. 4,155,394. This cable 20 comprises at least two yarns 21,22 of aramid filaments cabled together with at least one yarn 23 of oriented polyester or nylon. The stress-strain characteristics of such a cable are indicated by curve B of FIG. 7. While this type of cable can dissipate energy of a greater magnitude than the cable taught in U.S. Pat. No. 4,343,343 and therefore has utility as a reinforcing cable in the belt plies of tires subjected to certain ranges of loads and deflections, it does have limited utility that does not lend itself to extremely high load/deflection applications.

Referring next to FIG. 3 there is shown an example of a cable 30 consisting of three yarns 31,32,33 of aramid filaments twisted together with one another. Aramid cables having twist multipliers of about 6.5 are widely known in the tire art. For example, the stress-strain characteristics of an all-aramid cable having a twist multiplier of about 6.5 is represented by curve C of FIG. 7. The use of aramid cords having higher twist multipliers in pneumatic tires is disclosed commonly owned in U.S. patent application Ser. No. 061,364 filed on June 15, 1987, now U.S. Pat. No. 4,832,102, and a stress-strain curve for an all-aramid cable having a twist multiplier of about 9 is represented by curve D of FIG. 7. While this type of cable does have utility in certain applications its utility is limited by its elongation characteristics.

While all of the hereinbefore described cables have utility in tires having various performance requirements it is believed that a tire such as an aircraft tire with a radial carcass construction which will be operated at very high load/deflection levels requires yet a different reinforcing cable. A radial ply aircraft tire may be subjected to three times the deflection experienced by a truck tire, and a reinforcing cable is needed which can better dissipate the energy encompassed in a tire structure as it passes through the tire footprint. That is to say, the modulus of the reinforcing structure of a tire has to be capable of repeatedly supporting the deformations subjected thereto while carrying a specified load. A graphic representation of the stress/strain characteristics of a cable according to the invention is shown as curve E of FIG. 7 which has a greater area under the curve, and therefore better energy dissipation than the prior art cable 20 taught in U.S. Pat. No. 4,155,394 which is represented by curve B.

Figure 4:
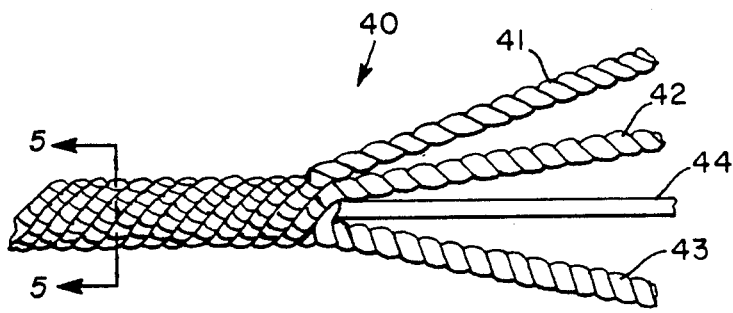
FIG. 4 is an enlarged view of a cable according to the present invention.
Figure 5:
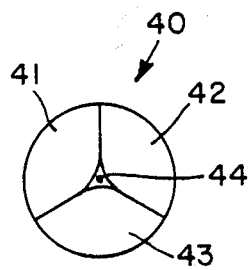
FIGS. 5 and 6 are schematic representations of cross sections of cables according to the invention.

Referring next to FIGS. 4 and 5 there is illustrated an example of a cable 40 manufactured in accordance with the present invention. In the example shown the new cable comprises three yarns 41,42,43 each of which consists only of aramid filaments. It is understood though that a cable according to the invention only needs to have at least two yarns consisting only of aramid filaments. As used herein and in the claims "consists of" or "consists only of" means that no filaments of any material other than that specified are present in a yarn. As used herein, and in the appended claims, "aramid" and "aromatic polyamide" are both understood to mean a manufactured fiber in which the fiber-forming substance is generally recognized as a long chain synthetic aromatic polyamide in which at least 85% of the amide linkages are attached directly to two aromatic rings. Representative of an aramid or aromatic polyamide is a poly (p-phenyleneterphthalamide).

A single core yarn 44 is disposed such that each of the aramid yarns 41,42,43 is adjacent to at least one other aramid yarn and is twisted about the core yarn, but the aramid yarns are not twisted about one another. That is to say, the aramid yarns completely surround the core yarn. The core yarn consists of at least one filament selected from the group consisting of polyamides which have at least a partially oriented structure and polyesters which have at least a partially oriented structure. As used herein and in the claims, a "core yarn" is understood to be a yarn that is not twisted together with, or twisted around any other yarn, although the filaments of a core yarn may be twisted together with one another. In a preferred embodiment the core yarn consists of at least one filament of at least partially oriented nylon, and in a most preferred embodiment the core yarn consists of at least two, (usually more than one hundred), filaments of a nylon which has a structure that is at least partially oriented, said nylon filaments being twisted together with one another.

"Orientation" and "oriented" refer to the degree of parallelism of the chain molecules of a polyamide or polyester. It is a common practice in the production of man-made textiles to subject the filaments thereof to a drawing process after the spin process. For the purposes of describing and claiming the present invention a polyamide or polyester is understood to have a structure which is at least partially oriented if it requires a force of at least 4 grams per denier to elongate it to a length which is 107% of its original length.

Figure 6:
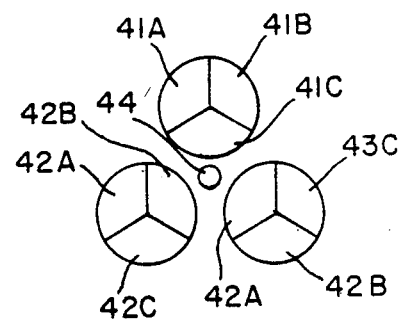

Each of the aramid yarns 41,42,43 of the new cable may comprise either a single group of aramid filaments or more than one subgroup of filaments, with the subgroups twisted together with one another to form a yarn. This feature of the invention can best be illustrated by referring to FIGS. 5 and 6. FIG. 5 is a schematic cross-sectional view of the cable 40 of FIG. 4 looking in the direction indicated by arrows 5—5 of FIG. 4. FIG. 6 is a similar cross-sectional view of an alternative embodiment wherein each of the aramid yarns 41,42,43 of the cable 40!are replaced by a number of subgroups 41$a$,41$b$,41$c$; 42$a$,42$b$,42$c$; 43$a$,43$b$,43$c$ which are twisted together to form a yarn having about the same denier as the yarns 41,42,43 of a cable that does not have its yarns divided into subgroups. As used herein and in the claims "denier" is understood to mean the weight in grams of 9,000 meters of a yarn, or subgroups, before the filaments therein have any twist imparted thereto. For example, a 1500/3 cable comprises three yarns each of which has a denier of 1500 before any twist at all is imparted thereto, such that the cable is referred to in the art as having a denier of 4500. (In reality though twisting forces a cable to have more mass per unit of length so the actual cable denier is somewhat higher).

There are several variables which contribute to the physical properties of a cable according to the new invention including, but not limited, to aramid denier, aramid vs nonaramid content, twist levels of yarns and cables, the manner in which the twist is imparted to the yarns or subgroups making up the yarns, and the application of coatings to the cables to facilitate their adhesion to a polymeric matrix.

The denier of the non-aramid core yarn 44 should preferably be in the range of 5% to 30% of the sum of the deniers of the aramid yarns 41,42,43 for any cable according to the invention. This ratio is important because the tenacity and elongation properties of the cables are dependent thereon, and these properties could be adversely affected by ratios outside of the preferred range in some practical applications.

A cable according to the invention preferably has a twist multiplier in the range of 5 to 12. "Twist multiplier" refers to a number that is an indicator of the helix angle that the yarns in a cable make with respect to a longitudinal axis of a cable. As used herein and in the claims the twist multiplier of a cable is determined according to the following equation which is well known in the textile art.

$$TM = .0137\, CT \times \sqrt{CD}$$

wherein
TM is the twist multiplier;
CT is the number of turns in the cable per 2.54 cm of cable length; and CD is the sum of the deniers of the yarns, and/or subgroups of the yarns of the cable before any twist is imparted to the yarns or subgroups.

The twist multiplier is an important feature of a cable according to the invention because physical properties like tensile strength, modulus, elongation and fatigue characteristics are functions of the twist multiplier.

In a preferred embodiment of the invention the ratio of the twist imparted to the aramid yarns 41,42,43 before they are assembled with a core yarn, to the twist imparted to the structure during the cabling operation is in the range of 1.0 to 2.0. This twist ratio is an important feature of a cable according to the invention because for a given twist multiplier the twist ratio determines the residual torque in a cable and the fatigue characteristics are highly dependent upon the twist multiplier in conjunction with the twist ratio.

It has been observed that in order to improve the properties of the new cable it is preferred, but not always necessary, to twist the aramid filaments into yarns in a two step process. Such a two step twisting process is described in RESEARCH DISCLOSURES 276-103-A. In such a two step process about 30-40% of the total twist is imparted in the first step and the remainder of the twist is imparted in the second step. Increases in tensile strength of about 10% have been experienced by the two step process over the one step process.

In the application of an adhesive promoting coating to the cables the tension, (stretching)on the cables can be varied to attain desired elongation and modulus characteristics in the cable. It is understood that a fabric engineer may in accordance with good engineering practice determine the tension necessary to attain the desired properties in a particular embodiment of the invention.

Laboratory tests of cables according to the invention have exhibited tensile strength and fatigue resistance that is at least equal to, and often greater than cables of the prior art discussed herein when the overall diameters of the cables was about equal to one another.

Referring next to FIG. 8, there is shown a cross-section of a pneumatic tire 80. A tire is understood to be an example of an article of manufacture employing the new cables that have already been disclosed, but other articles of manufacture can also comprise an elastomeric substance with the new cables embedded therein.

The tire 80 has a plurality of carcass plies 81,82,98 which extend between a pair of annular beads 83,84 and are folded thereabout. The carcass plies 81,82,98 are reinforced by side-by-side cables of a suitable structure, preferably extending at angles in the range of 70° to 90° with respect to the centerplane CP of the tire. It is understood that in accordance with one aspect of the invention all or some of the carcass plies of a tire may comprise cables of the type disclosed herein.

A belt reinforcing structure 85 is disposed radially outwardly of the carcass plies 81,82,98 in a crown portion of the tire. In the example shown the belt reinforcing structure comprises a folded belt 86 and a plurality of unfolded belts 87,88,89,90. At least one restrictor ply 91,92 may be disposed radially outwardly of the belt reinforcing structure 85. It is understood that in accordance with another aspect of the invention all or some of the belt plies of a tire may comprise cables of the type disclosed herein.

It is further understood that with respect to tires comprising the new cables, the exact configuration of the carcass plies and/or the belt reinforcing structure is not considered to be a limitation upon the claimed invention. It is also understood that a tire may have: (a) only one or more carcass plies comprising the new cables; (b) only one or more belt plies comprising the new cables; or both one or more belt plies and one or more carcass plies comprising the new cables.

If desired, in an article of manufacture such as a tire other components of the tire may be located in the tire sidewalls 94,95, or bead regions 96,97, or even between a carcass ply 81 and the innerliner 93 and contain the new cables.

While certain representative embodiments and details have been shown for the purpose of illustrating the invention, it will be apparent to those skilled in the art that various changes and modifications may be made therein without departing from the spirit or scope of the invention.

We claim:

1. A cable comprising:
   (a) at least two yarns each of which consist only of aramid filaments; and
   (b) a single core yarn which is not twisted together with or around any other yarn and consists of at least one filament selected from the group consisting of polyamides having a structure which is at least partially oriented and polyesters having a structure which is at least partially oriented such that a force of about 4 grams per denier is required to elongate said core yarn to 107% of its beginning length, said aramid yarns being adjacent to one another and twisted about said core yarn but not about one another, the denier of said core yarn being in the range of 5% to 30% of the sum of the deniers of said aramid yarns, said cable having a twist multiplier in the range of 5 to 12, and the ratio of twist in the aramid yarns to the twist in the cable being in the range of 1.0 to 2.0.

2. An article of manufacture comprising an elastomeric substance having a plurality of side-by-side cables embedded therein, each said cable comprising:
   (a) at least two yarns each of which consists only of aramid filaments; and
   (b) a single core yarn which is not twisted together with or around any other yarn and consists of at least one filaments selected from the group consisting of polyamides having a structure which is at least partially oriented and polyesters having a structure which is at least partially oriented such that a force of at least 4 grams per denier is required to elongate said core yarn to 107% of its beginning length, said aramid yarns being adjacent to one another and twisted about said core yarn but not about one another, the denier of said core yarn being in the range of 5% to 30% of the sum of the deniers of said aramid yarns, each said cable having a twist multiplier in the range of 5 to 12 and the ratio of twist in the aramid yarns to the twist in the cable being in the range of 1.0 to 2.0.

3. A pneumatic tire having at least one belt ply comprising a plurality of side-by-side cables, each said cable comprising:
   (a) at least two yarns each of which consists only of aramid filaments; and
   (b) a single core yarn which is not twisted together with or around any other yarn and consists of at least one filaments selected from the group consisting of polyamides having a structure which is at least partially oriented and polyesters having a structure which is at least partially oriented such that a force of at least 4 grams per denier is required to elongate said core yarn to 107% of its beginning length, said aramid yarns being adjacent to one another and twisted about said core yarn but not about one another, the denier of said core yarn being in the range of 5% to 30% of the sum of the deniers of said aramid yarns, each said cable having a twist multiplier in the range of 5 to 12 and the ratio of twist in the aramid yarns to the twist in the cable being in the range of 1.0 to 2.0.

4. A pneumatic tire having at least one carcass ply comprising a plurality of side-by-side cables, each said cable comprising:
 (a) at least two yarns each of which consists only of aramid filaments; and
 (b) a single core yarn which is not twisted together with or around any other yarn and consists of at least one filaments selected from the group consisting of polyamides having a structure which is at least partially oriented and polyesters having a structure which is at least partially oriented such that a force of at least 4 grams per denier is required to elongate said core yarn to 107% of its beginning length, said aramid yarns being adjacent to one another and twisted about said core yarn but not about one another, the denier of said core yarn being in the range of 5% to 30% of the sum of the deniers of said aramid yarns, each said cable having a twist multiplier in the range of 5 to 12 and the ratio of twist in the aramid yarns to the twist in the cable being in the range of 1.0 to 2.0.

5. A pneumatic tire having at least one carcass ply and at least one belt ply, said carcass ply and belt ply each comprising a plurality of side-by-side cables, each said cable comprising:
 (a) at least two yarns each of which consists of only aramid filaments; and
 (b) a single core yarn which is not twisted together with or around any other yarn and consists of at least one filaments selected from the group consisting of polyamides having a structure which is at least partially oriented and polyesters having a structure which is at least partially oriented such that force of at least 4 grams per denier is required to elongate said core yarn to 107% of its beginning length, said aramid yarns being adjacent to one another and twisted about said core yarn but not about one another, the denier of said core yarn being in the range of 5% to 30% of the sum of the deniers of said aramid yarns, each said cable having a twist multiplier in the range of 5 to 12 and the ratio of twist in the aramid yarns to the twist in the cable being in the range of 1.0 to 2.0.

* * * * *